UNITED STATES PATENT OFFICE.

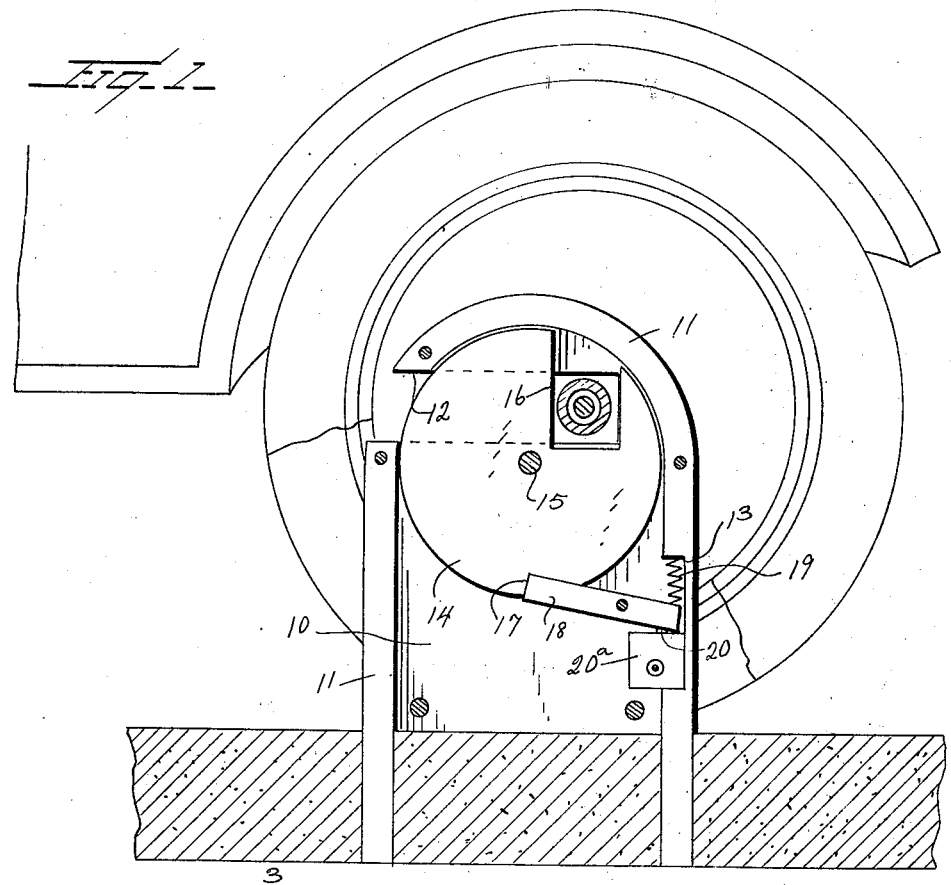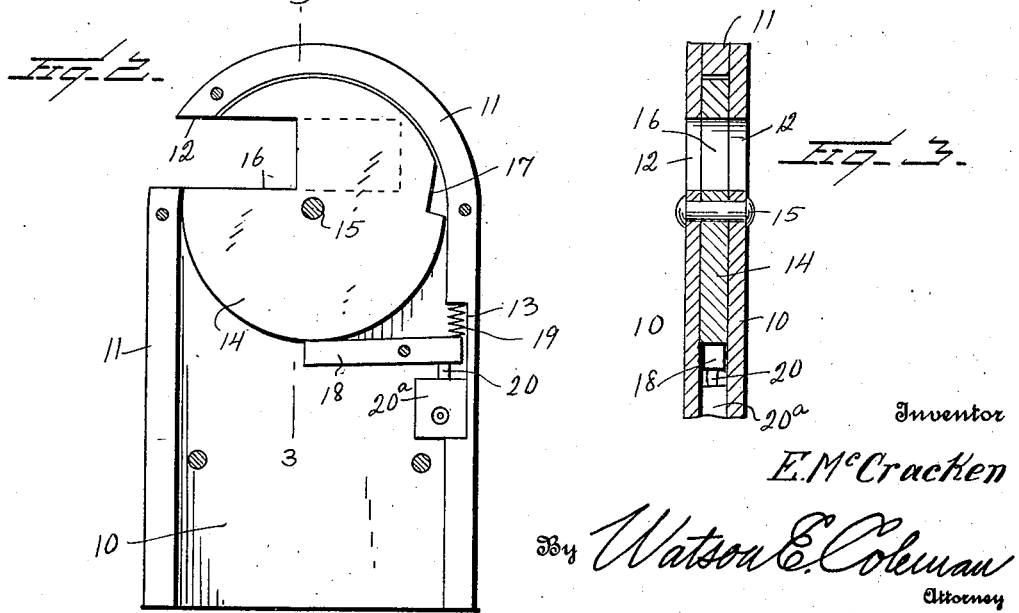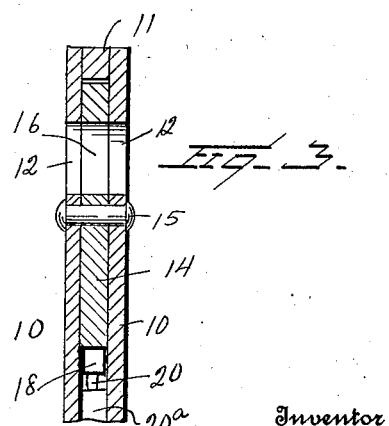

EDGAR McCRACKEN, OF ALBIA, IOWA.

AUTOMOBILE-LOCK.

1,351,297.   Specification of Letters Patent.   Patented Aug. 31, 1920.

Application filed August 9, 1919. Serial No. 316,362.

*To all whom it may concern:*

Be it known that I, EDGAR McCRACKEN, a citizen of the United States, residing at Albia, in the county of Monroe and State of Iowa, have invented certain new and useful Improvements in Automobile - Locks, of which the following is a specification, reference being had to the accompanying drawings.

This invention relates to automobile locking devices, and particularly to a locking device of such character as to engage with an automobile axle or like projecting part and lock the machine from movement.

The general object of my invention is to provide a locking device which is fixed in position and which extends upward from its base and into which the axle of an automobile may be shifted by a proper movement of the automobile, this movement of the axle into the locking device causing the automatic locking of the axle until a key is used to unlock the device.

A further object is to provide a device of this character including an upwardly extending member having its lower end embedded in concrete and having a slot adjacent its upper end at such a height that the axle of an automobile may pass into the slot, said member having at its upper end a locking plate with which the axle engages, which locking plate is rotated by the axle to a locking position and then becomes latched so that the automobile cannot be shifted from its engagement with the locking device until this latch is released by the use of a proper key.

Other objects will appear in the course of the following description.

My invention is illustrated in the accompanying drawings, wherein:—

Figure 1 is a side elevation of my automobile lock, one of the side walls of the lock casing being removed and the foundation in which the lock casing is mounted being shown in section;

Fig. 2 is a like view to Fig. 1, but showing the locking disk in its receiving position;

Fig. 3 is a section on the line 3—3 of Fig. 2.

Referring to these drawings, it will be seen that my device comprises an upwardly extending casing which is relatively thin and whose lower end is adapted to be embedded in concrete and which consists of two laterally disposed plates or webs, designated 10, disposed in spaced relation to each other, and which plates are riveted together, one or both of the plates being formed with a marginal flange 11 which extends around the margin of the device and extends over the space between the plates. These plates are preferably made of steel, and ordinarily the plates will be 17" high by 10" wide. Each of the side plates is formed adjacent its upper end with an inwardly extending slot 12, the slot extending through the flange 11, and the flange 11 is also cut away, at 13, at one point for a purpose to be later stated.

Disposed within the casing formed by the plates 10 and the flange 11 is a locking disk or plate 14 which is circular in form and pivoted, at 15, and which is formed with a tangential slot 16. This slot is adapted in one position of the disk 14 to aline with the slots 12, and in another position of the disk to be disposed at right angles to the slots 12. This slot and the slots 12 are preferably about 2½" in width. Diametrically opposite one side wall of the slot 16, the plate is formed with a notch 17, and coacting with this notch is a detent 18 in the form of a pivoted latch, one end of which rides over the periphery of the disk and is adapted to shift into the notch 17. The opposite end of the latch may be pressed downward by a spring or urged downward by gravity. I have shown a spring for this purpose, which is designated 19, but I do not wish to be limited to this.

Key actuated means is intended to be used for the purpose of raising the outer end of the latch 18 to release the disk. I have illustrated for this purpose a lock such as a pin lock having a bolt 20. By inserting the key in this lock and rotating it, the bolt 20 may be forced upward, thus forcing the latch up and releasing it from its engagement with the notch 17 of the disk. I do not wish to be limited to this locking means, however, as any key actuated lock might be used for this purpose. The two side plates 10 may be held together at a plurality of points by means of heavy rivets or like means. The locking device is embedded about two inches deep in a concrete base, designated 21, but I do not wish to be limited to this, as any suitable means may be used for holding the locking device stationary and with the slots 12 at a proper height to receive the axle of an automobile.

In its unlocked position, the disk 14 is disposed so that the slot 16 is in line with the slots 12. Now if an automobile is run up to this locking device and its axle or like projecting part is forced into the slots 12, the rearward movement of the axle will cause the disk to rotate to the position shown in Fig. 1, and as soon as the disk has rotated to this position, the forward end of the latch 18 will be projected into the notch 17, thus locking the disk from a reverse rotation. This latch cannot be released from its engagement with the disk until the outer end is forcibly raised, as for instance, by inserting a key in the lock casing 20$^a$ and projecting the bolt upward to force the outer end of the detent 18 and release its forward end from the disk. Then the automobile may be shifted under its own power to carry the axle out of the slot and this will cause the rotation of the disk back to its initial position.

In the use of this device, when the driver of a car has locked his car, he removes the key from the lock and then later when he wishes to use the car, he inserts the key and projects the bolt of the lock so as to permit the rotation of the locking disk to its discharge position. The key may then be left in the lock or removed, or it is obvious that if locks of this character are used on public stands or parks, that a keeper or guard may be provided with a master key which will open all the locks, and this keeper or guard may be called upon to release any automobile.

The device is particularly adapted to be used in garages, parks, or other public parking places. It will be seen that my device is very simple, is cheaply made and may be readily installed and that it will prevent the stealing of cars.

While I have illustrated and designed the lock to be used to engage the axle of an automobile, it will be obvious that it might be used for other projecting portions on the car.

While I have illustrated a form of my invention which I believe to be thoroughly practical and effective in use, yet I do not wish to be limited to this, as it is obvious that many changes might be made therein without departing from the spirit of the invention.

I claim:—

1. An automobile lock comprising a vertical casing having a horizontally extending slot, a rotatable disk disposed within the casing and having a straight tangential slot adapted in one position of the disk to register with the slot in the casing and in the other position to extend transversely to the casing slot, and means within the casing for locking the disk in the last named position.

2. An automobile lock comprising a vertical casing having a horizontally extending straight slot, a disk disposed within and rotatably mounted on the casing and having a straight tangential slot adapted in one position of the disk to register with the slot in the casing and in the other position to extend transversely to the casing slot, a latch mounted in the casing and adapted to engage the disk and hold it in the last named position, and key actuated means for releasing said latch.

3. An automobile lock of the character described comprising a vertically extending, fixed casing having a horizontal straight slot adapted to receive the axle of an automobile, a disk-like locking member pivoted within the casing for rotation in a vertical plane and having a tangential straight slot of the same width as the slot in the casing and adapted to aline and register therewith or, when the disk is rotated, to extend at right angles to the casing, the disk being provided in its periphery with a notch, a latch pivoted within the casing and adapted to engage at one end with said notch, and a key actuated member disposed within the casing and adapted to engage with the other end of the latch to release it from its engagement with the disk.

4. An automobile lock comprising a vertical casing having two side walls and a marginal flange, the casing being adapted to be embedded at its base, the upper end of the casing being formed with a straight horizontal, inwardly extending slot of a width to receive the axle of an automobile, a disk pivoted within the casing and having a tangential slot of the same width as and adapted to aline with the slot of the casing in one position of the disk or to extend at right angles to the slot in the casing in another position of the disk, the periphery of the disk being notched, a latch normally bearing against the periphery of the casing and yieldingly forced into said notch when the disk is turned to its locking position, and key actuated means for shifting said latch out of its engagement with the notch.

In testimony whereof I hereunto affix my signature.

EDGAR McCRACKEN.